July 13, 1954

B. COOPER ET AL 2,683,870

TOLL CHECKING SYSTEM

Filed Nov. 29, 1951

INVENTORS.
BENJAMIN COOPER
ALBERT F. HOHMANN
BY

*J. B. Felshin*
ATTORNEY.

July 13, 1954 — B. COOPER ET AL — 2,683,870
TOLL CHECKING SYSTEM
Filed Nov. 29, 1951 — 6 Sheets-Sheet 2

INVENTORS.
BENJAMIN COOPER
ALBERT F. HOHMANN
BY
ATTORNEY.

July 13, 1954   B. COOPER ET AL   2,683,870
TOLL CHECKING SYSTEM
Filed Nov. 29, 1951   6 Sheets-Sheet 4

INVENTORS.
BENJAMIN COOPER
ALBERT F. HOHMANN
BY
ATTORNEY.

July 13, 1954 B. COOPER ET AL 2,683,870
TOLL CHECKING SYSTEM
Filed Nov. 29, 1951 6 Sheets-Sheet 6

INVENTORS.
BENJAMIN COOPER
ALBERT F. HOHMANN
BY
ATTORNEY.

Patented July 13, 1954

2,683,870

UNITED STATES PATENT OFFICE 2,683,870

TOLL CHECKING SYSTEM

Benjamin Cooper, New York, N. Y., and Albert F. Hohmann, Teaneck, N. J.; said Hohmann assignor to said Cooper Application November 29, 1951, Serial No. 258,884

14 Claims. (Cl. 340—332)

This invention relates generally to toll checking systems and in particular to a toll register for registering and indicating data incident to the collection of tolls.

With rising costs of operation and maintenance, many toll roads, bridges and tunnels were required to discontinue conventional fixed fee toll charges and initiate a program of toll charges based on relative size and type of vehicle. As a result thereof, commercial trucking vehicles presented a special problem due to the wide variance in capacity and size and accordingly, an equitable solution resolved in the establishment of toll charges based on the number of axles per vehicle. The existing toll registering apparatus required adaptation to provide for the increased number of differing tolls and in accordance therewith, supplemental apparatus was required to register the increased vehicular classifications. The effort to accurately register the toll revenue introduced burdens upon the toll operators and permitted errors to occur. Further, the operation of multiple registration apparatus increased the time consumed by each toll transaction and resulted in traffic jams.

The present invention relates to indicating means associated with a toll register of the character described in applicants' co-pending U. S. application, Serial No. 243,252, filed August 23, 1951, wherein the desired registration apparatus is assembled as a unit having inter-related manual controls that are simple and positive in operation.

Therefore, one object of the invention is to provide in a toll register of the character described, a plurality of toll registering keys each being of a differing denomination; an interlock for said keys to prevent concurrent actuation of two or more keys, a plurality of independently operable keys, each being of still different denomination; a plurality of classification keys, each being interlocked to prevent concurrent actuations of two or more of said classification keys; a transaction key to register a charge or credit transaction; and related indicating devices associated with the respective keys to indicate the amount and classification of each transaction.

The invention is further directed toward the provision of an overhead indicating device that may be observed by supervisory personnel at a point remote from the toll station. Said device is operable with each register actuation to indicate the amount of the collected toll and the classification of the vehicle paying such a toll.

The provision of visible indicator means permits checking of the accuracy of toll collection operations and tends to prevent surreptitious practices.

Therefore, another object is to provide in an indicating device formed by a plurality of individually energizable electrical devices, means to energize differing combinations of said electrical devices to represent the amount and classification of the differing transactions.

Another object resides in the provision of means to extinguish said indicating devices for a predetermined portion of each transaction cycle; energize said devices for a greater predetermined period of said transaction cycle; and retain said indicating device in energized condition after said transaction cycle has been completed until a second classification transaction is initiated.

Other ancillary objects will in part be obvious and in part hereinafter pointed out.

In the drawings:

Fig. 4a is a fragmentary cross section of a toggle actuated switch locking means in locking position.

Fig. 4b is a fragmentary side elevation of the switch locking means illustrated in Figs. 4 and 4a.

Fig. 4c is a fragmentary side elevation of a push button locking pawl and support.

Fig. 6 is an enlarged fragmentary detail of the timer unit clutch with the clutch facing cut away.

Fig. 7 is a fragmentary cross section of the timer unit switch controlling cams.

Fig. 8 is an enlarged fragmentary view of the intermediate mounting structure for the split push button locking shaft taken along line 8—8 of Fig. 3.

Fig. 9 is a fragmentary front elevation of the timer unit.

Figs. 10 and 11 are views illustrating the long and short forms, respectively, of the identifier keys.

Figure 1:
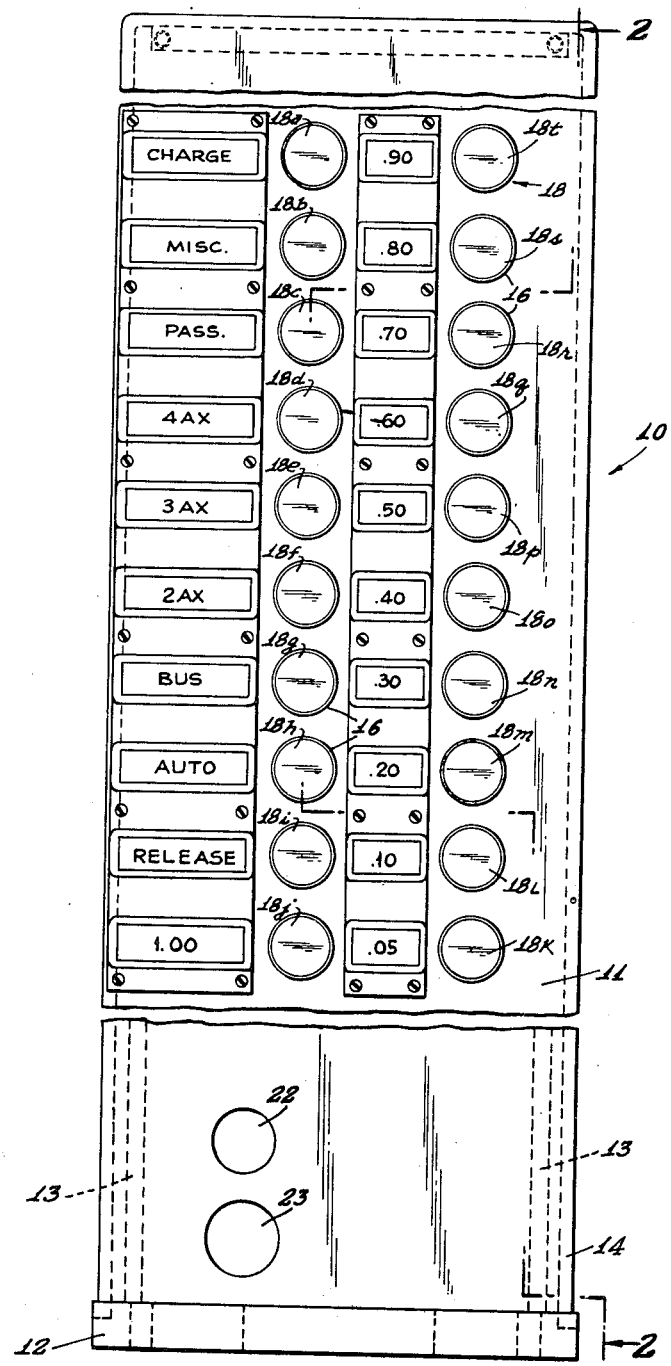
Fig. 1 is a front elevation of a keybox.
Figure 2:
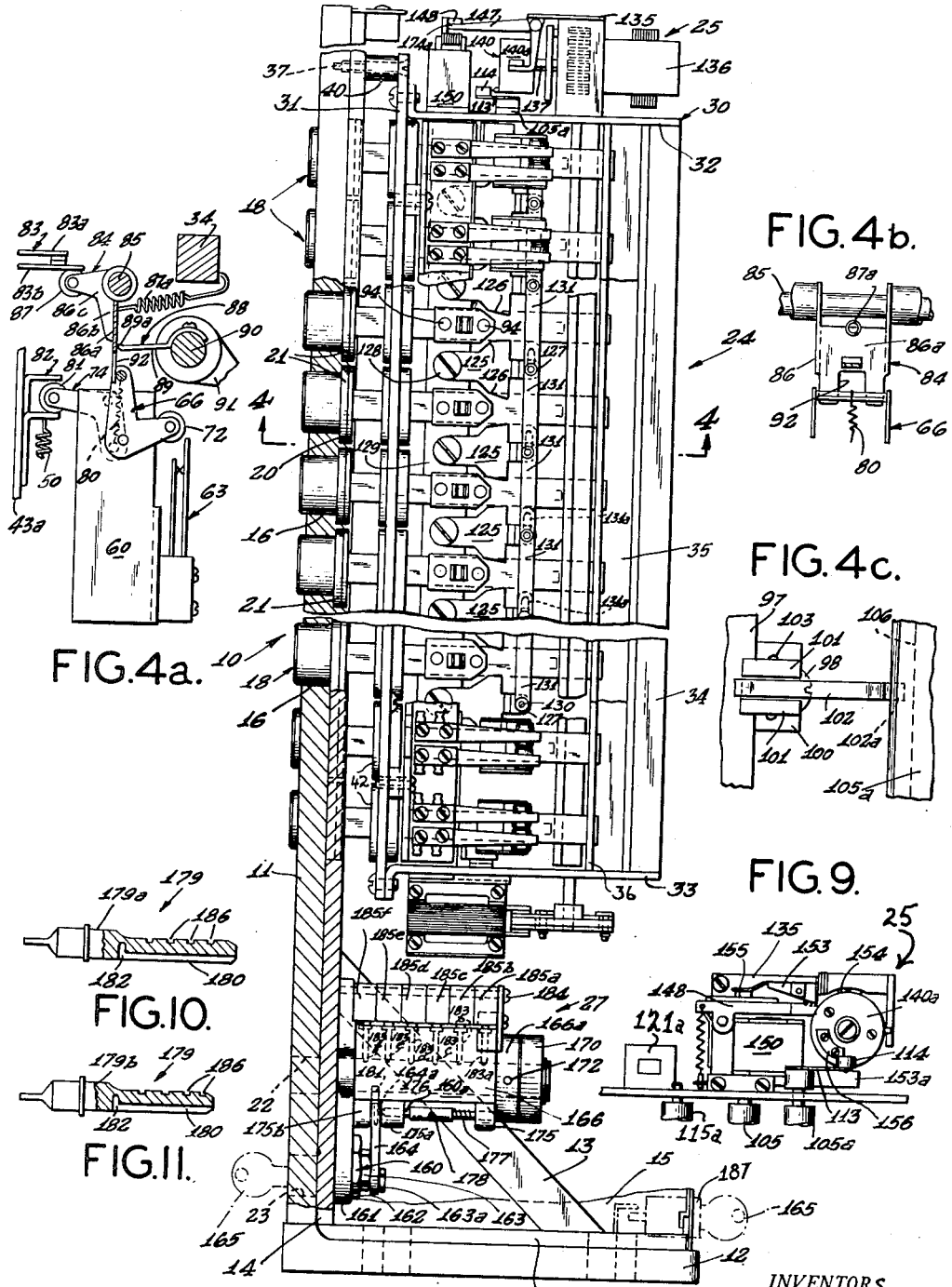
Fig. 2 is a side elevation taken in cross section along line 2—2 of Fig. 1, illustrating the timer unit, the push button switch selector and the key-operated identifier and push button lock.
Figure 3:
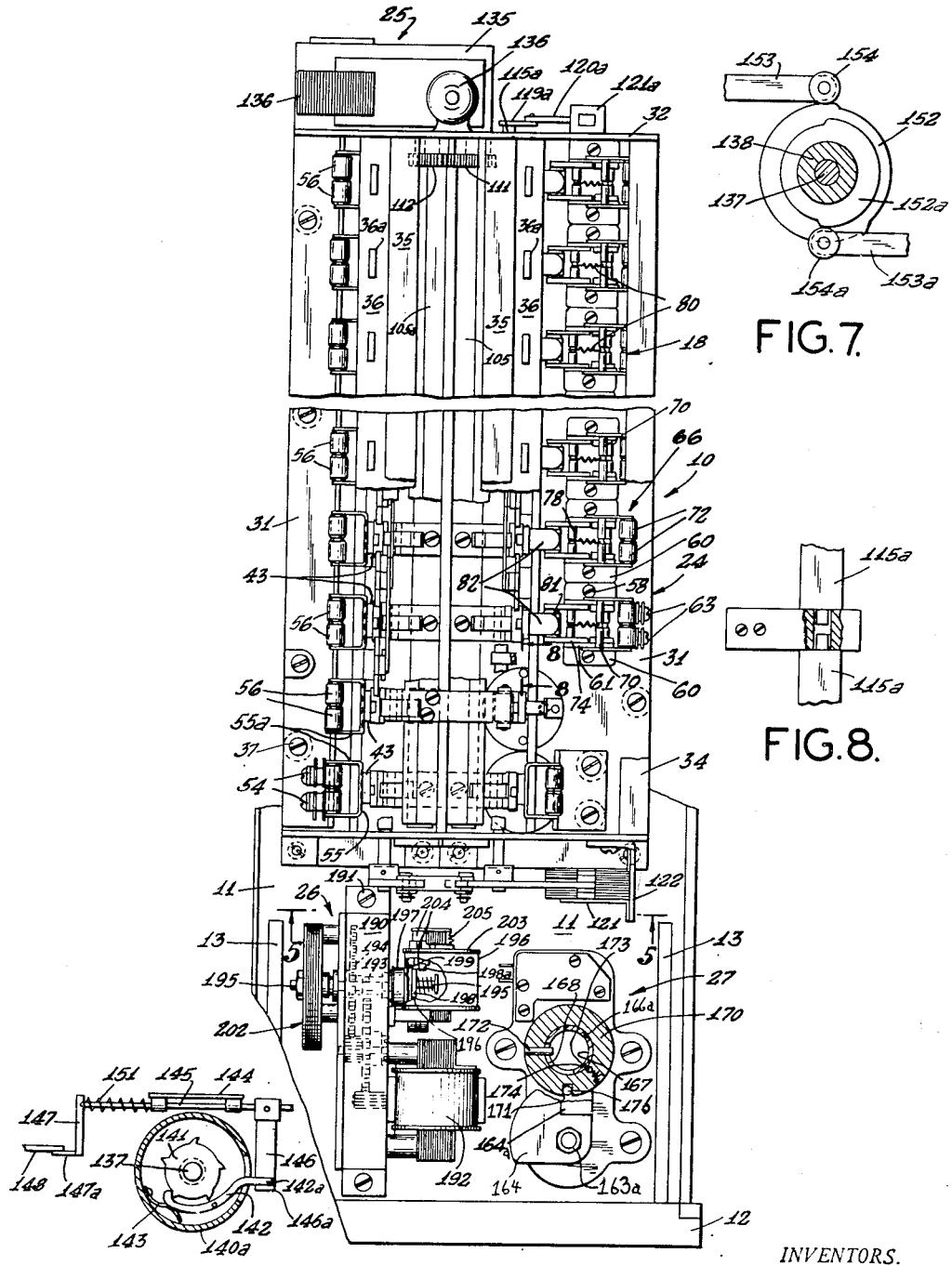
Fig. 3 is a rear elevation partially cut away, of the keybox with cover removed illustrating the disposition of the components including the pulser mechanism.

Referring to Figs. 1, 2 and 3, of the drawings in detail, 10 generally designates a keybox embodying the present invention. Keybox 10 comprises a vertical frame wall 11 supported by a horizontal base wall 12 and reinforced by angular braces 13. Walls 11 and 12 are provided with recessed margins 14 to receive the marginal edges of a cover 15 therein. Formed in spaced parallel relation in wall 11 are two vertical rows of concentric through apertures 16 having push buttons 18 disposed therein. Each of the apertures 16 is enlarged at the rear terminal thereof to form a shoulder 20. Radial flanges 21 on said push buttons are arranged to reside in the enlarged openings and abut against shoulders 20. Disposed in the lower portion of wall 11 are through apertures 22, 23 provided for a purpose hereinafter appearing.

Keybox 10 is arranged to receive component units 24, 25, 26 and 27 therein. Unit 24 is a push button switch selector; unit 25 is a timing device; unit 26 is a pulsing device and unit 27 is a key-operated identifier and push button lock.

Figures 4, 5:
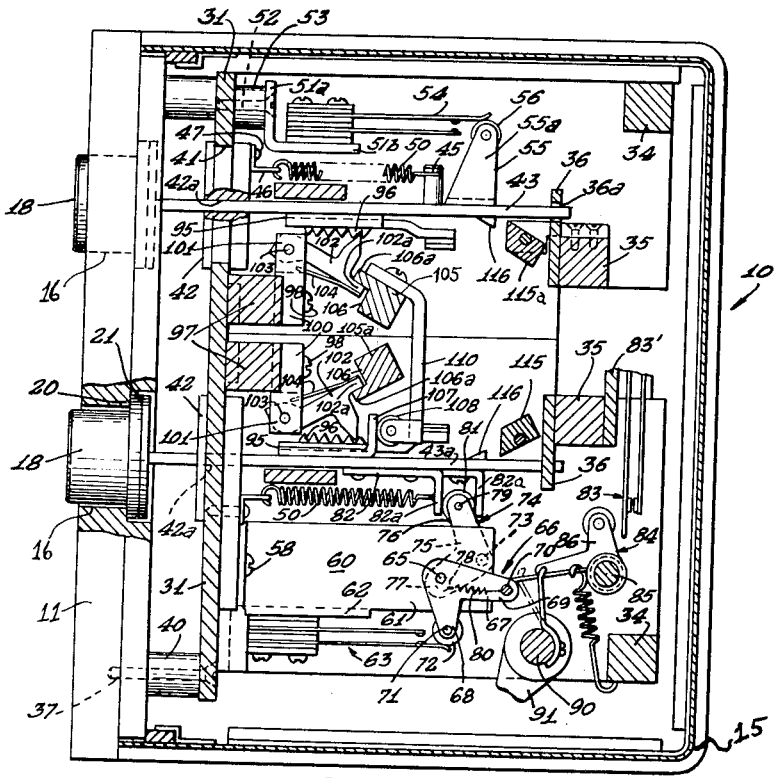
Fig. 4 is a bottom view taken in cross section along line 4—4 of Fig. 2, illustrating the push buttons and related elements in their normal positions.
Fig. 5 is a bottom view of the lock bar releasing mechanism taken in cross section along line 5—5 of Fig. 3.

Push button selector unit 24 generally comprises an internal frame 30 having a front vertical wall 31 and horizontal upper and lower walls 32, 33 respectively. Interposed between walls 32, 33, Figs. 3 and 4, are plural vertical spacer rods 34 and 35. Rods 35 have secured to the forward side thereof guide plates 36 that are each perforated with a row of vertically disposed rectangular openings 36a.

Vertical wall 31 is secured to frame wall 11, as by screws 37 and spacers 40 and has provided therein plural rows of concentric apertures 41 coaxially disposed relative to push button apertures 16. Secured in apertures 41 are buffer inserts 42 and centrally formed therein are rectangular openings 42a. Openings 42a are disposed in alignment with openings 36a and in each related pair, a push button slide bar 43 or 43a is slidably supported. Each of said slide bars is anchored at one end in a push button 18, thus, manual depression of a push button imparts rearward movement to the related slide bar. When so actuated, push button 18 abuts against buffer insert 42 to limit the rearward movement thereof. Slide bars 43 have pins 45 transversely extending therefrom. Interposed between each pin 45 and a bracket 46 secured, as by rivets 47, to buffer insert 42, is a coil spring 50 that is tensioned to urge said slide bar forwardly to seat push button flange 21 against shoulder 20. Adjacent slide bars 43 is a vertical angle bracket 51 having arm 51a secured, as by screws 52 and spacers 53, to vertical frame wall 31. Arm 51b of bracket 51 is disposed parallel to slide bars 43 and has affixed thereon plural switch groups 54.

Means are provided to actuate a switch group 54 when the related slide bar 43 is actuated by the depression of its associated push button 18. To this end there is secured to each bar 43, a U-shaped member 55 having parallel transversely extending arms 55a and a pair of coaxial rollers 56 rotatably secured therebetween. Rollers 56 are normally disposed in engagement with one contact of each switch in switch groups 54.

Therefore, rearward actuation of slide bars 43 releases rollers 56 from engagement with said contacts and actuates the respective switches. Switch groups 54 control means disclosed in the cited co-pending application and form no part of the present invention.

Mounted on wall 31, parallel to slide bars 43a, as by screws 58, are a plurality of U-shaped members 60 each having parallel horizontal walls 61 and an interconnecting vertical wall 62. Mounted on the vertical wall 62 of each U-shaped member are plural switch groups 63, each comprising the normally biased to closed position insulated spring fingers, but maintained open when the device is not in operation, in the manner hereinafter appearing.

Means is provided to permit a group of open switches 63 to close when the respective push button is pressed, and to open again when pressure is released from said push button allowing said push button to return to its initial position. To this end, on the outer surfaces of horizontal walls 61 and near the edges thereof are stud pins 65. Rotatably mounted on said stud pins is a toggle unit 66, comprising a pair of aligned bell cranks 67, having arms 68 and 69, and being interconnected by spacer rods 70 and 71. Rotatably mounted on spacer rod 71 are two insulated rollers 72. Said rollers contact one of the spring fingers of switches 63 holding the spring fingers apart.

Affixed to the inner surface of horizontal walls 61, are stud pins 73. Said stud pins 65, 73 are in vertical planes parallel to front wall 31. Rotatably mounted about stud pins 73 is a toggle unit 74, comprising a pair of aligned bell cranks 75 having arms 76 and 77, and being interconnected by means of spacer rods 78 and 79. Rod 78 is connected to rod 70 by a coil tension spring 80. A roller 81 is rotatably mounted on rod 79 carried by arms 76. Roller 81 is disposed inbetween arms 82a of U-shaped member 82 secured to slide bar 43a. Pressing a related push button 18 will thus rotate unit 74 in a clockwise direction from the position viewed in Figure 4 to the position illustrated in Figure 4a.

By rotating toggle unit 74 in a clockwise direction, spring 80 is rotated in clockwise direction about the rod 79. When spring 80 passes beyond a line interconnecting rods 70 and 78, a pulling force will be exerted on toggle unit 66 urging it to rotate in counter-clockwise direction. The rotation of a toggle unit 66 will be halted when rod 70 engages the upper margins of horizontal walls 61. The degree of rotation of toggle unit 74 is controlled by the movement of U-shaped member 82.

Upon release of slide bar 43a, push button 18 will return to initial position. Spring 50 exerts a leftward pull on toggle unit 74, rotating the same in a counter-clockwise direction until button flange 21 again contacts shoulder 20 in vertical frame wall 11. Spring 80 will be rotated by toggle unit 74, in a counter-clockwise direction about rod 70. When spring 80 passes beyond a line interconnecting rods 70 and 78, force will be exerted on toggle unit 66 rotating it in a clockwise direction until rod 70 contacts the upper margins of horizontal walls 61.

The spring fingers of each switch in a group 63 are normally held out of engagement by the insulated roller 72 on toggle unit 66. By rotation of toggle unit 66 in a counter-clockwise direction upon depressing a push button, said spring fingers are allowed to contact. The return of toggle unit 66 to its initial position will again interpose the insulated rollers between the related spring fingers, opening the contacts.

A plurality of switches 83 mounted on a vertical plate 83' affixed to a spacer rod 35 are adapted to be individually actuated by the respective toggle units 66. Interconnecting toggle units 66 and switches 83 are plural bell-crank members 84 journalled in spaced relation on a vertical shaft 85 affixed to the upper and lower frame walls 32 and 33 respectively. Bell-crank members 84 comprise a pair of bell-cranks 86 disposed in parallel relation and formed with a transverse bridge portion 86a between the respective arms 86b thereof. Interposed between arms 86c is a roller 87 arranged for engagement with contact 83a of switch 83. Bridge portion 86a of member 84 is disposed in engagement with toggle unit 66 and is held in engagement therewith by means of a coil spring 87a. With toggle unit 66 in its actuated position, roller 87 presses contact 83a into engagement with contact 83b. The restoring of toggle unit 66 to its initial position releases rollers 87 and permits switch 83 to open. A locking device 88, Figs. 4, 4a and 4b, is provided to latch bell-crank member 84 against restoration to its initial position and consequently retains switch 83 closed. Locking device 88 comprises a plurality of resilient fingers 89 transversely extending from a pivotal vertical shaft 90. Arm 91 secured to shaft 90 is urged by spring means, not shown, in a clockwise direction to maintain fingers 89 in operating relationship with members 84.

Finger 89 is disposed to normally abut against the base of slot 92 recessed in bell-crank bridge portion 86a. The terminal portion 89a of finger 89 is angularly formed whereby clockwise rotation of bell-crank members 84 cams said finger counterclockwise, as shown in Figure 4. Continued clockwise rotation of bell-crank member 84 permits finger 89 to drop out of slot 92, Fig. 4a, to engage bridge portion 86a and thus prevent counter-clockwise rotation thereof after toggle unit 66 has restored to its initial position. In this manner, switch 83 is held closed after push button 18 has been released.

The actuation of a second push button 18 and its respective toggle unit 66 will cam all fingers 89 counter-clockwise which permits the previously held bell-crank unit 84 to return to open-switch position, under the influence of its related spring 87a. The operation of locking devices 88 is completely disclosed in U. S. Patent No. 2,293,935, issued August 25, 1942.

Thus, it is apparent that switch 83 associated with a depressed push button will remain closed after the release of said push button until a second push button in the same group is subsequently depressed.

Switches 83 control overhead indicating means, as will hereinafter be described in detail.

Secured to the inner sides of the respective slide bars 43, 43a, as by screws 94, are interlock camming members 95 having serrated racks 96 integrally formed on one face thereof. Means are provided to cooperate with racks 96 to retain actuated or depressed push buttons in actuated condition. To this end there are provided a pair of vertical fixed bars 97 secured to the rear of frame wall 11 and interposed between the respective push button slide bars 43, 43a. Secured to bars 97, as by screws 98, are plural bifurcated members 100 (see Figs. 4 and 4c). Each member 100 is disposed in the plane of a respective push button slide bar and has interposed tines 101, a pawl 102. Pawls 102 are pivotally secured, as by pins 103, to members 100. Each pawl has affixed thereto, a leaf spring 104, the free terminal of which is disposed intermediate tines 101 to abut against member 100 and pawl 102. Accordingly, said pawls are urged into engagement with racks 96. Depression of a push button slide bar 43 or 43a causes rack 96 to displace pawl 102 as each tooth on said rack rides thereunder. Thus, pawl 102 normally engages rack 96 to prevent retraction of the respective slide bar 43, 43a by spring 50.

Means are provided to release pawls 102 from racks 96 to enable springs 50 to return all depressed push buttons to normal position. To this end there is provided a pair of vertical rotatable shafts 105 and 105a of substantially rectangular cross-section, journalled in the respective upper and lower frame walls 32 and 33. Each of said shafts has a longitudinal recess 106 in which projections 102a of pawls 102 reside. Flange 106a accordingly, abuts against said pawl projections.

Push button 18i, designated the release button, has affixed to the slide bar 43a associated therewith, a bracket 107. Adapted to be engaged by bracket 107 is a roller 108 carried by a lever 110. Lever 110 is affixed to shaft 105. Thus, rearward movement of slide bar 43a and bracket 107 pivots lever 110 and shaft 105 counter-clockwise. Flange 106a on shaft 105 engages the related pawl projections 102a and pivots said pawls clockwise out of engagement with any of the depressed racks 96. Slide bars 43, therefore, are free to return to normal position under the influence of springs 50.

Shafts 105 and 105a have affixed thereto, Fig. 3, adjacent the upper frame wall 32, meshing pinions 111, 112 respectively. Affixed to the upper terminal of shaft 105a is a cam 113 having a roller 114 journalled thereon. Roller 114 is adapted to be engaged by means hereinafter described, to rotate shaft 105 counter-clockwise and shaft 105a clockwise, as viewed in Figure 4, to release those push buttons held depressed by pawls 102. While it appears that a rack 96 is affixed to the slide bar 43a, Fig. 4, associated with release button 18i, it will be understood that the illustrated rack 96 is actually mounted on the slide bar 43 associated with push button 18h. Obviously, it is not desirable to retain release button 18i in depressed condition, therefore, rack 96 is omitted from the related slide bar 43a. Therefore, said button immediately returns to normal position upon the release of manual pressure.

Disposed adjacent slide bars 43, 43a and journalled in the upper and lower frame walls 32, 33 are push button locking shafts 115, 115a. Shafts 115, 115a are disposed to engage projections 116 inwardly extending from the respective slide bars 43 and 43a to prevent rearward movement of said slide bars. Shafts 115, 115a are pivoted from the angular projection engaging position shown in Figure 4, to a position substantially parallel to said slide bars whereby said slide bar projections are not engageable by said shafts. As shown in Figure 5, shafts 115, 115a have secured thereto, arms 117a, 117b respectively. Pivotably secured to the terminals of arms 117a, 117b, is a link 118. Secured to one of said shafts is a second arm 119. Arm 119 is pivotally secured to plunger 120 of solenoid 121 secured to the under side of wall 33, as by bracket 122. A spring 123 interposed between arm 119 and a pin 124 affixed to wall 33, urges said arm clockwise to normally position shafts 115 in slide bar locking position. Therefore, only when solenoid 121 is energized, and shafts 115 are rotated to non-locking position, are push buttons 18 depressable. The means for energizing solenoid 121 is disclosed in the cited co-pending application.

Means are provided to prevent the concurrent depression of more than one push button in certain groups of said buttons. As shown in Figure 1, push buttons 18 are further designated as 18a, 18b, 18c, etc. Push button 18a, the charge button, is independently actuable. Push buttons 18b through 18h are provided with interlocking means that prevent actuation of a second push button while one of said group of push buttons is actuated. Analogously, push buttons 18k through 18s are provided with interlocking means to prevent concurrent actuation of two or more push buttons in said group. The remaining push buttons 18j and 18t are independently actuable.

The interlocking means comprises the camming members 96, affixed to the respective slide bars 43 and 43a, and coacting pivotally mounted levers 125; Figure 2. Each lever 125 is formed with diametrically opposite wing portions 126 and laterally extending projection 127. Levers 125 are pivotally secured, as by screws 128, to a pair of spaced vertical bars 129 interposed between and affixed to the upper and lower frame walls 32 and 33, pivotally secured, as by screws 130, to projection 127 of the next higher lever 125. Analogously, a second link 131 is disposed between the latter lever 125 and the next higher lever 125 of the group. Links 131 interconnect adjacent levers 125 in each group in the hereinbefore described manner.

Levers 125 are so arranged, that actuation of a respective push button causes camming member 96 thereon to displace adjacent levers 125 upwardly and downwardly, respectively. Member 96 cams wing portions 126 of adjacent levers 125 apart and retains said levers in separated condition. The remaining levers 125 cannot be sufficiently separated by a second camming member 96 to permit the latter member and associated slide bar to move rearwardly. Therefore, the proportionate spacing between levers 125 prevents concurrent actuation of two or more push buttons.

Means is provided to retain depressed push buttons 18 in depressed condition for a predetermined period of time to insure registration of the toll data associated with the respective push buttons. To this end there is provided a timing unit 25, Figs. 2, 6, 7 and 9, comprising a gear reduction box 135 affixed to the upper side of frame wall 32. Secured to the rear side of gear box 135 is an electric motor 136 which is arranged to rotate forwardly extending shaft 137 at a reduced speed. Journalled on shaft 137 is a sleeve 138, the forward end of which is secured to clutch casing 140a of clutch 140. Secured to the portion of shaft 137 in clutch casing 140a is a ratchet wheel 141. Pivotally secured to the inner face of clutch casing 140a is a pawl 142 having a portion 142a projecting radially from said clutch casing. A leaf spring 143 urges pawl 142 into engagement with ratchet wheel 141. Secured to gear box 135 is a bracket 144 and journalled in said bracket is a shaft 145. Arm 146 affixed to shaft 145 has a projection 146a extending perpendicularly therefrom. Projection 146a is arranged to engage the projecting portion 142a of pawl 142, to disengage said pawl from ratchet wheel 141. Thus, shaft 137 may freely revolve while clutch casing 140a and sleeve 138 remain stationary. Secured to shaft 145 is a lever 147 provided with a perpendicularly extending arm 147a. Arm 147a is engageable by armature 148 of solenoid 150. Energization of solenoid 150 by means disclosed in the cited co-pending application, attracts armature 148 thereto to rotate lever 147, shaft 145 and arm 146. Projection 146a on arm 146 disengages from pawl projection 142a permitting said pawl to engage ratchet wheel 141. Accordingly, clutch casing 140a rotates with shaft 137. Torsion spring 151 circumjacently disposed on shaft 145 has one end secured to lever 147 and the other end secured to bracket 144, and upon deenergization of solenoid 150, arm 146 is returned by said spring to engage pawl 142 and disengage said pawl from ratchet wheel 141. Solenoid 150 is momentarily energized, therefore, lever 146 returns to its pawl engaging position immediately after clutch casing 140a starts rotating and thereby limits the revolving of said casing to one revolution. Affixed to and rotatable with sleeve 138 is a cam 152. Pivotally secured to gear box 135 is a lever 153 having a follower roller 154 journalled on one end thereof and disposed for peripheral engagement with cam 152. The other end of lever 153 is disposed for engagement with a normally open micro-switch. Cam 152 is so formed that roller 154 resides on a high dwell of cam 152 when clutch 140 is disengaged. Accordingly, said microswitch is closed thereby and is arranged to control electrical indicating devices hereinafter appearing.

As shown in Figure 9, the outer casing 140a of clutch 140 has secured thereon, a cam high dwell 155. Engageable by said cam is roller 114 journalled on arm 113 affixed to shaft 105a. Cam high dwell 155 is arranged to engage roller 114 substantially near the end of one revolution of clutch casing 140a. Therefore, shafts 105 and 105a are actuated through roller 114 and arm 113 to release all depressed push buttons.

Thus, it is apparent that all manually depressed push buttons 18 having racks 96 thereon, will remain depressed for a predetermined period of time under the control of timer unit 25.

Unit 27, Figs. 2 and 3, the key-operated identifier and push button key-lock control, provides a means to unlock push buttons 18 for subsequent operation and further produce a record of identification of the operator using said keybox. Unit 27 comprises a pair of key-receivers 160 and 160a mounted in a frame 161. Key-receiver 160 comprises a fixed cylindrical lock barrel 162 disposed in aperture 23 and secured to frame 161 and vertical front frame 11. Rotatable within barrel 162 is a tumbler lock cylinder 163 having a camming segment 164 secured, as by nut 163a, to the rear terminal thereof. Cylinder 163 is rotatable by means of a removable key 165, however, said key may only be removed when said cylinder is disposed in one of two angular positions.

Key-receiver 160a comprises a fixed cylindrical barrel 166 formed with a reduced diametrical portion 166a and a through concentric bore 167. Portion 166a is provided with an arcuate transverse peripheral slot 168 of substantially ninety degrees arc communicating with bore 167. Journalled on the periphery of portion 166a is a collar 170 having an axial slot 171 formed in the periphery thereof. Secured in a suitable aperture in collar 170 is an inwardly extending radial pin 172 arranged to project through slot 168 into bore 167. Thus collar 170 is retained on portion 166a and limited in rotation to the length of slot 168. Collar 170 has provided on the internal periphery thereof, a spring loaded ball bearing 173 arranged to cooperate with a concentric recess 174 formed on the outer periphery of portion 166a and functions in a well known manner to prevent vibratory rotation of collar 170.

Cylindrical barrel 166 is further provided with plural raised bosses 175, 175a and 175b. Bosses 175, 175a have suitable coaxial apertures therein which a rod 176 is slidably journalled. Circumjacently disposed on rod 176 is a coil spring 177 and a fixed sleeve 178. Rod 176 is of such length as to terminate at one end in alignment with the outer sides of boss 175 and extend at the other end externally of boss 175a. Spring 177 and sleeve 178 normally urge rod 176 to extend externally of boss 175a. Interposed between boss 175a and boss 175b is camming segment 164. Camming segment 164 has an inclined recess 174a formed in one corner thereof, in which the normally projecting terminal portion of rod 176 resides. The rotatable segment 174 is arranged to cam rod 176 rearwardly upon clockwise rotation of key 165. However, rod 176 is stopped by collar 170 except when slot 171 in said collar is positioned in alignment with said rod. When said slot is not aligned with rod 176, segment 164 cannot be rotated since the rod projects into segment recess 164a. Therefore, key 165 is not removable unless collar 170 is disposed with slot 171 in alignment with rod 176. Collar 170 is rotatable by means of a special identifier key 179.

Key 179, formed with a peripheral axial groove 180, Figures 2, 3, 10 and 11, is insertable in bore 167 substantially for the length thereof whereby pins 181, 172 enter said groove. Pin 181 is secured to cylindrical barrel 166 and projects downwardly into bore 167 to prevent the entry of surreptitious keys. Key 179 is further provided with a transverse groove 182 wherein pin 181 may enter upon the rotating of said key. Groove 182 insures the complete insertion of the key, prior to the rotating thereof. Disposed in cylinder barrel 166 diametrically opposite to pin 181, are plural spaced plungers 183a, 183b, 183c, 183d, 183e and 183f. Secured to frame 161, as by screws 184, are plural micro-switches 185a, 185b, 185c, 185d, 185e and 185f, each being disposed in operative alignment with the respective plungers 183a, etc. Switches 185a through 185e, inclusive, are of the normally open type and switch 185f is of the type having a pair of fixed contacts and a swinging contact engageable alternately therewith. Switches 185a through 185e are adapted to be closed by key 179 engaging plungers 183 upon the rotating thereof. Switch 185f is actuable by the insertion of key 179 in bore 167. To selectively actuate predetermined combinations of switches 185a, 185b, 185c, and 185d, keys 179 are discriminately provided with transverse grooves 186 in which plungers 183 may enter upon the rotating of said key. In this manner, those plungers 183 entering said grooves are not actuated while the remaining plungers not having grooves 186 to enter, are actuated and the respective switches closed thereby. Accordingly, each operator is issued an individually differing key 179 having differing grooves 186 which actuates an individual combination of switches 185. The actuated switches control means described in the cited copending application, that effectively identifies the particular key and consequently the operator using said key. It will be noted that key 179 is provided in two forms, i. e., a long form 179a and a short form 179b. The long form key 179a is arranged to actuate collar 170 to permit the removal of key 165 while the short form key 179b cannot reach pin 172, and therefore cannot actuate collar 170. Key 179a is provided for maintenance use only, whereby key 165 may be removed and inserted in cover keylock 187 to permit the removal of cover 15. Keys 179b issued to the toll operators, do not permit removal of key 165, therefore, said toll operators cannot remove cover 15 to gain access to keybox 10.

Pulsing unit 26, Fig. 3, comprises a gear box 190 affixed to vertical frame wall 11, as by screws 191. An electric motor 192 mounted on gear box 190 is arranged to drive a sleeve 193 by means of gear train 194. Sleeve 193, journalled on shaft 195 extends jointly therewith through one side of gear box 190. Coupling sleeve 193 to shaft 195, is a clutch mechanism 196 comprising, a clutch plate collar 197 affixed to sleeve 193, a spring loaded clutch plate 198 affixed to shaft 195 and a cork disc 199 disposed therebetween. Secured to the end of shaft 195 extending through the other side of gear box 190, is a rotary switch contact 200 disposed for wiping engagement with fixed contacts 201 of switch assembly 202, secured to the gearbox. Thus, rotation of sleeve 193 by motor 191 will through said clutch mechanism, rotate shaft 195 and contact 200.

A solenoid 203 mounted on gear box 190 has its armature 204 arranged to engage a dog 198a radially extending from clutch plate 198 and hold said plate against rotation. Energization of solenoid 203 actuates armature 204 to release plate 198 for rotation. The energization of said solenoid is momentary, therefore, spring 205 urges armature 204 to reengage dog 198a before clutch plate 198 has completed one revolution. Thus, contact 200 wipes across fixed contacts 201 in stepping relation. The wiping action of contact 200 with contacts 201 pulses counting means. Said counting means are fully described in the copending application Serial No. 243,252, filed August 23, 1951.

Figure 12:
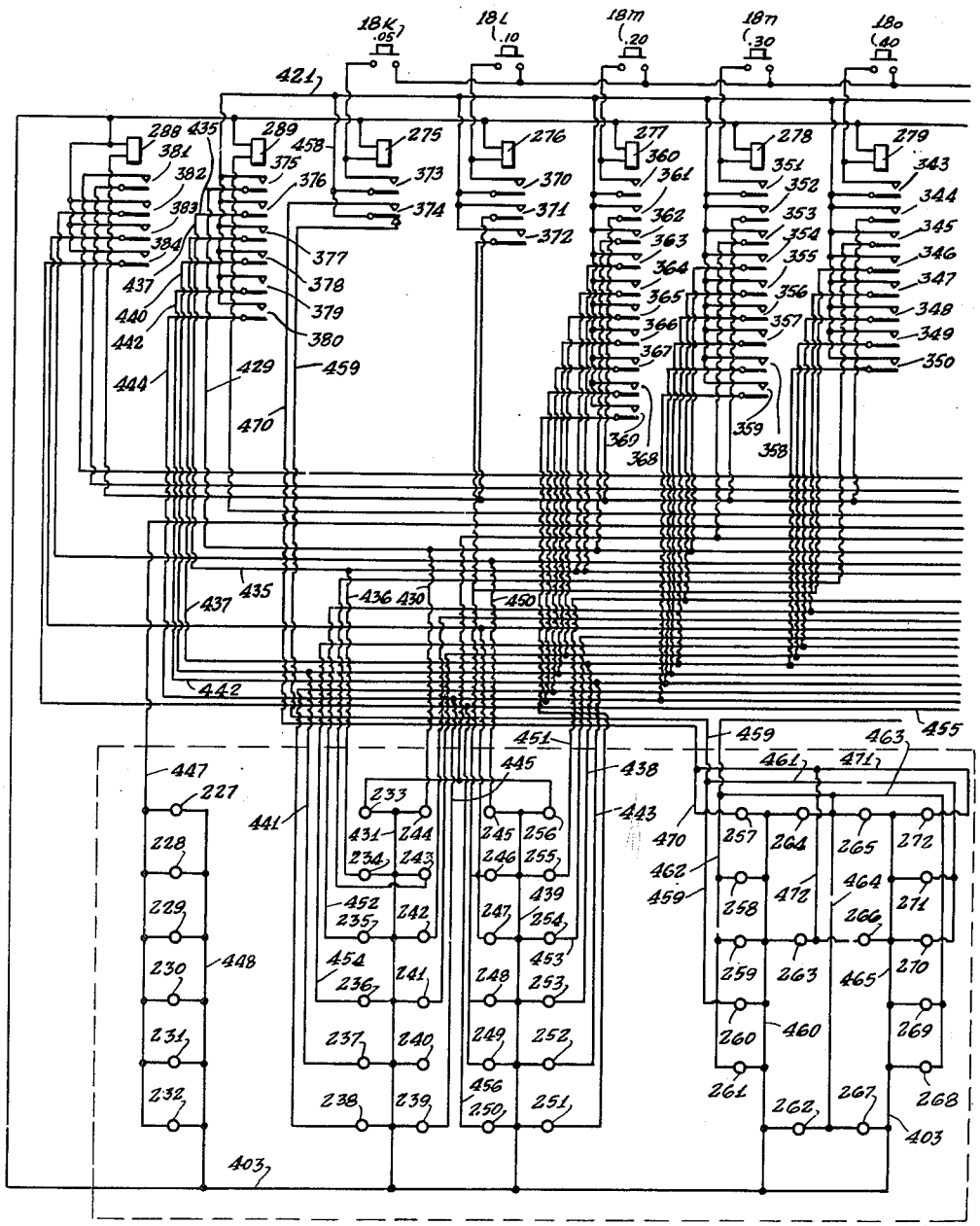
Figs. 12 and 13 are schematic wiring diagrams of the indicator electrical circuits.
Figures 13, 14:
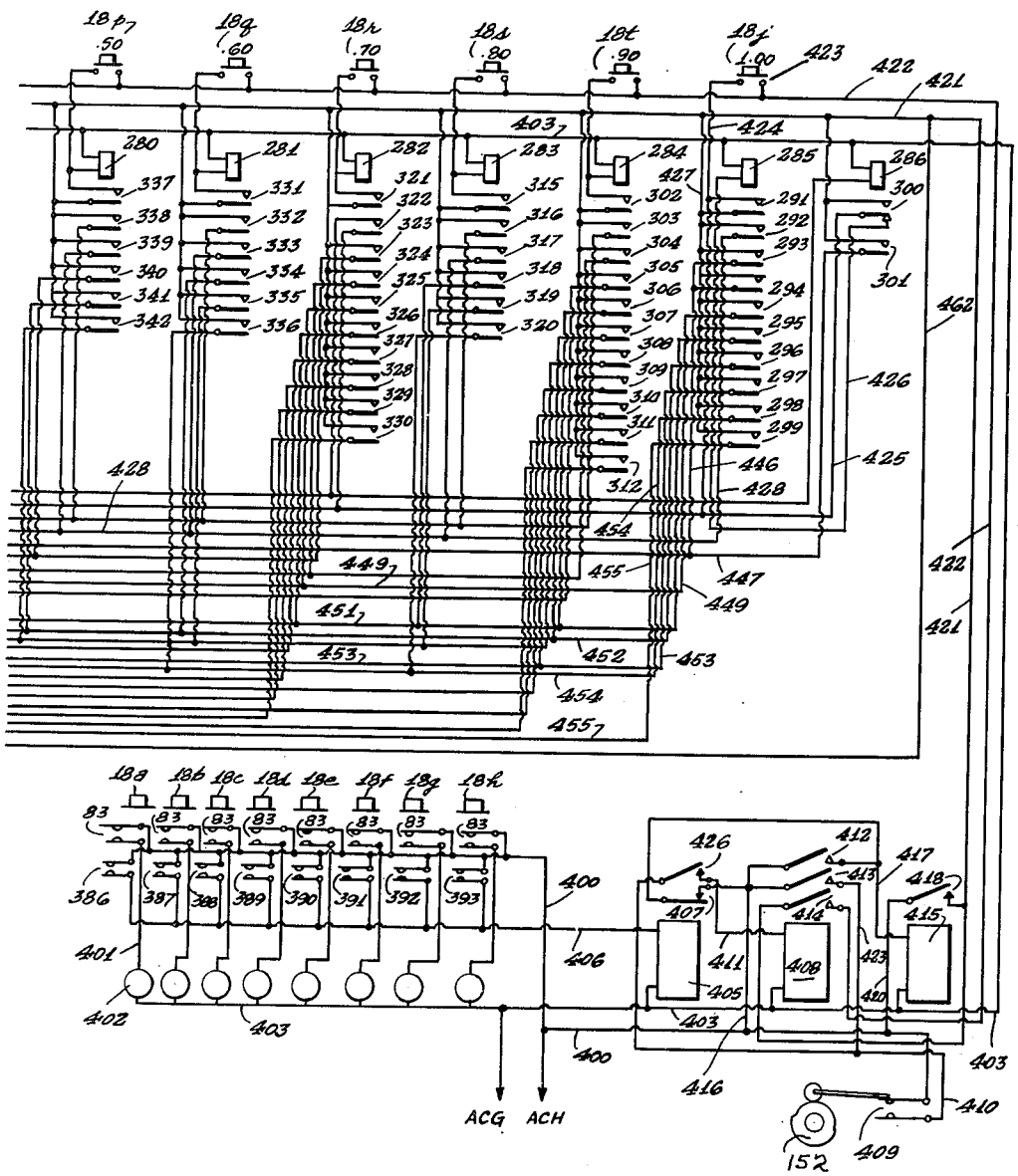
Fig. 14 is a block diagram showing the assembled relationship of Figs. 12 and 13.

Referring to Figs. 12, 13 and 14, the present invention appertains to means cooperable with the hereinbefore described mechanisms to indicate the amounts of the respective tolls and the classification of the vehicle paying said tolls at a point visible to the vehicle drivers and to supervisory personnel that may be observing from a remote point.

To this end there is provided an overhead indicating device 225 of conventional structure, not shown, but indicated by dotted line in Fig. 12, having nine vertically disposed rows of incandescent bulbs individually designated 227 through 272. Said bulbs are disposed in vertical and horizontal linear relation and are individually energizable to form differing combinations of numbers. Said numbers are determined by the actuation of the respective amount push buttons 18j through 18t, inclusive.

Push button 18j has designated thereon the amount of one dollar and when actuated, controls the energization of incandescent bulbs 227 through 232. The subsequent energization of bulbs 227 through 232 effectively outlines the number one.

Incandescent bulbs 257 through 272 are controlled by the push button 18k. Push buttons 18j through 18t control relays 275 through 285, respectively. Relay 285 controlled by push button 18j further controls relay 286. Relay 285 when energized, is adapted to close normally open switches 291 through 299. Relay 286 when energized, is adapted to actuate switches 300 and 301. Switch 300 is of the double-pole single-throw type wherein a swinging contact moves from engagement with one contact into engagement with a second contact. Switch 301 is of the normally open type adapted to close when said relay is energized. Relay 284 when energized is adapted to close normally open switches 302 through 312. Relay 283 associated with push button 18s is adapted to close normally open switches 315 through 320 when energized. Relay 282 associated with push button 18r is adapted to close normally open switches 321 through 330 when energized. Relay 281 is adapted to close normally open switches 331 through 336 when energized. Relay 280 associated with push button 18p is adapted to close normally open switches 337 through 342 when energized. Relay 278 associated with push button 18n is adapted to close normally open switches 351 through 359 when energized. Relay 277 associated with push button 18m is adapted to close normally open switches 360 through 369 when energized. Relay 276 associated with push button 18l is adapted to close normally open switches 370, 371 and 372 when energized. Relay 275 associated with push button 18k is adapted to actuate switches 373 and 374 when energized. Switch 373 is of the normally open type and closes upon the energization of said relay. Switch 374 is of the double-pole single-throw type and the swinging contact thereof is adapted to move from engagement with one contact into engagement with the second contact when said relay is energized. Relay 289 when energized is adapted to close normally open switches 375 through 380. Relay 288 when energized is adapted to close normally open switches 381 through 384.

As hereinbefore set forth, actuation of a respective classification push button closes the related switch 83. Closure of the related switch 83 energizes a related indicating device to indicate that a particular push button has been actuated.

As shown in Fig. 13, the actuation of push button 18a closes switch 83 associated therewith to complete a circuit from ACH buss 400 through said switch over conductor 401 to one terminal of indicator 402. The terminal of indicator 402 is connected to ACG buss 403. Concurrently with the actuation of push button 18a a second switch, namely switch 386, is actuated to a closed position. Switch 386 controls the energizing circuit for relay 405. This circuit may be traced as follows: from ACH buss 400, through switch 386, over conductor 406 to one terminal of relay 405. The other terminal of relay 405 is connected to ACG buss 403. Thus, relay 405 becomes energized.

The energization of relay 405 closes switch 426 and opens switch 407. Switch 426 completes a circuit that energizes relay 406 over a circuit that may be traced as follows: from ACH buss 400 through cam controlled switch 409, over conductor 410 through closed switch 426 over conductor 411 to one terminal of relay 408, the other terminal of relay 408 is connected to ACG buss 403, thus relay 408 becomes energized when switch 409 is closed. Switch 409 is controlled by cam 152 of the timer unit 25. The energizing of relay 408 closes normally open switches 412, 413 and 414. Switch 412 when closed completes a circuit that energizes relay 415. This circuit may be traced from: ACH buss 400, over conductor 416, through closed switch 412, over conductor 417, to one terminal of relay 415. The other terminal of relay 415 is connected to ACG buss 415. Relay 403 becomes energized and switch 418 associated therewith closes. Switch 418 completes a circuit from ACG buss 400 over conductor 420 through closed switch 418 to conductor 421 thus conductor 421 now carries ACH potential. Switch 418 therefore, controls the ACH common conductor 421. Switch 413 associated with relay 408 is disposed in parallel relation with switch 409, therefore the energization of relay 408 completes a circuit from: ACH buss 400, through switch 412, over conductors 423, 410, closed switch 426, over conductor 411 to the relay 408. A holding circuit is established by the energization of relay 408 and that is a circuit existing from common ACH conductor 421, through switch 414, over conductor 422, to one terminal of switches 423 associated with each of the push buttons 18j through 18t.

Push buttons 18b through 18h also have associated therewith related indicators 402 that are energizable upon actuation of the respective push buttons. Accordingly, since the switch 83 controlling said indicators remains actuated or in closed position even after said push buttons have been restored to normal the related indicator remains energized until a second push button is actuated.

Analogously, the incandescent bulbs controlled by the respective push buttons 18j through 18t remain energized subsequently to the returning of the respective push buttons to normal position. Thus, incandescent bulbs that are energized are extinguished upon the actuation of a second classification push button in the group 18a through 18h and the incandescent bulbs controlled by those amount push buttons actuated immediately prior to the actuation of the second classification push button now become energized. This is accomplished by means of relays 275 through 285 remaining energized. Each of the relays 275 through 289 is adapted to control differing combinations of incandescent bulbs 227 through 272. Push button 18j when actuated prepares a circuit that will subsequently energize incandescent bulbs 227 through 232. This circuit may be traced as follows: from ACH common conductor 422, through switch 423, associated with push button 18j, over conductors 424, 425, the normally closed contact of switch 300, conductor 426, to the coil of relay 285. The remaining terminal of the coil of relay 285, is connected to ACG buss 403. Thus, relay 285 becomes energized when one of the classification push buttons 18a through 18h is actuated and the relays 405, 408 and 415 are energized. Switches 291 through 299 associated with said relay move from a normally open position to a closed position. Switch 291 provides a holding circuit for said relay which may be traced as follows: from ACH common conductor 421, over conductor 427, through closed switch 291, over conductors 424, 425, the closed contacts of switch 300, over conductor 426 to one terminal of the coil relay 285. The other terminal of the coil of relay 285 being connected to ACG buss 403 completes said holding circuit. Therefore, the release of push button 18j will not deenergize relay 285. Switches 292 through 299 control the following circuits to effectively outline on indicator 225 the numerical representation of $1.00. Switch 292 when closed energizes relay 289 and switches 375 through 380 associated with relay 289, move from an open position to a closed position. The circuit for energizing relay 289 may be traced as follows: from ACH common conductor 421, over conductor 427, through switch 292, over conductor 428, to one terminal of the coil of relay 289. The other terminal of the coil of relay 289 is connected to ACG buss 403. Thus, relay 289 energizes. Switch 375 completes a circuit that energizes incandescent bulb 244. This circuit exists from ACH common conductor 421, through closed switch 375, over conductors 429, 430, to one terminal of the incandescent bulb 244. The other terminal of incandescent bulb 244 is connected by conductor 431 to ACG buss 403. Thus, incandescent bulb 244 is energized.

Switch 376 completes a circuit to incandescent bulb 234 as follows: from ACH buss 421, through said switch, over conductors 435, 436, to one terminal of bulb 234. The other terminal of bulb 234 is connected by conductor 431 to ACG common 403.

Switch 377 completes a circuit as follows: from ACH buss 421, through said switch, over conductors 437, 438, to one terminal of incandescent bulb 253. The other terminal of incandescent bulb 253 is connected by conductor 439 to ACG common 403.

Switch 378 completes a circuit from ACH buss 421 through said switch and over conductors 440, 441, to one terminal of bulb 237. The other terminal of bulb 237 is connected to conductor 431 and ACG buss 403.

Switch 379 completes a circuit from ACH buss 421 through said switch and over conductors 442, 443, to one terminal of bulb 252. The other terminal of bulb 252 is connected by conductor 439 to ACG common 403. Switch 380 completes a circuit from ACH buss 421 through said switch, over conductors 444, 445 to one terminal of incandescent bulb 239. The other terminal of incandescent bulb 239 is connected by conductor 431 to ACG common 403.

Switch 293 associated with relay 285 when actuated completes a circuit from ACH buss 421 through said switch, over conductors 446, and 447, to one terminal of each incandescent bulb in the group 227 through 232. The opposite terminal of each of said bulbs is connected by conductor 439 to ACG common 403.

Switch 295 completes a circuit from ACH buss 421, through said switch, over conductor 451, to one terminal of incandescent bulb 255. The other terminal of said bulb is connected by conductor 439 to ACG common 403.

Switch 296 completes a circuit from ACH bus 421, through said switch, over conductor 452, to one terminal of incandescent bulb 235. The terminal of said bulb is connected by conductor 431 to ACG common 403.

Switch 297 completes a circuit from ACH buss 421 through said switch and over conductor 453 to one terminal of incandescent bulb 254. The other terminal of said bulb is connected by conductor 439 to ACG common 403.

Switch 298 completes a circuit from ACH buss 421 through said switch, over conductor 454 to one terminal of incandescent bulb 236. The other terminal of said bulb is connected by conductor 431 to ACG common 403.

Switch 299 completes a circuit from ACH buss 421 through said switch, over conductors 455, 456, to one terminal of incandescent bulb 256. The other terminal of said bulb is connected by conductor 439 to ACG common 403.

Switch 374 associated with relay 275 normally completes a circuit when said relay is deenergized. This circuit exists from ACH buss 421, over conductor 458, through the normally closed contact of said switch, over conductor 459 to one terminal of incandescent bulb 260. The other terminal of said bulb is connected by conductor 460 to ACG buss 403. Further, a parallel circuit exists from conductor 459, over conductor 461 to one terminal of each of the respective bulbs 270, 271. A standby circuit exists from ACH buss 421, over conductor 462 to one contact of each of the respective incandescent bulbs 258, 259 and 261. The other terminals of said incandescent bulbs are commonly connected to conductor 460 which is in turn connected to ACG common 403. Another parallel circuit exists from conductor 462, over conductor 463, to one terminal of each of the incandescent bulbs 268 and 269. A third parallel circuit exists from conductor 463, over conductor 464 to one terminal of each of the incandescent bulbs 262, 267, 264 and 265. The other terminals of incandescent bulbs 266, 271, 270, 269, 268 and 267 are commonly connected to ACG conductor 403.

Thus, incandescent bulbs 227 through 232 are energized to effectively outline the hundreds digit one. Incandescent bulbs 244, 245, 255, 254, 253, 252, 256, 238, 237, 236, 235 and 234 effectively outline in the tens column a zero.

In the units column incandescent bulbs 258, 259, 260, 261, 262, 267, 268, 269, 270, 271, 265 and 264 are energized to effectively outline a zero. Thus, the digits representing one dollar are shown on indicator 225.

The release of push button 18j interrupts the initial circuit that energized the associated relay 285. However, the aforesaid holding circuit maintains said relay in energized condition. Analogously, relay 289 remains energized after said push button has restored to normal. Therefore, the numerical representation of one dollar remains on said indicator until a subsequent push button of the group 18a through 18h is actuated.

Upon the restoration of the previously depressed push button in the group 18a through 18h, the actuated switch in the group 386 through 393 opens and relay 405 deenergizes. Switch 407 returns to a closed relationship while switch 426 restores to an open relationship. However, switch 407 is so designed that said switch will close prior to the opening of switch 426. In this manner relay 415 remains energized and switch 418 associated therewith remains closed thereby effectively energizing ACH common 421 to continue supplying potential to the aforesaid holding circuits. Relay 408 is deenergized by the opening of switch 426 and switches 412, 413 and 414 associated with said relay return to open position. Switch 414 accordingly interrupts the supply of ACH potential to ACH common 422. Consequently, any of the amount push buttons in the group 18j through 18t may be depressed to set up a new amount without energizing the related groups of incandescent bulbs in indicator 225.

Upon actuation of a subsequent push button in the group 18a through 18h, the switch 83 associated with the previously depressed push button is released and the switch 83 associated with the newly depressed push button is actuated. The classification indicator 402 associated therewith becomes energized and the previous classification is deenergized. The particular switch in the group of switches 386 through 393 that is closed by the actuated classification push button energizes relay 405. Switch 407 accordingly opens and switch 426 closes. The opening of switch 407 interrupts the energizing circuit for relay 415 and switch 418 associated therewith also opens. Thus, the relays previously held energized in the group 275 through 289 are deenergized and all switches associated therewith return to their initial positions. Relay 408 however, does not reenergize immediately upon the closure of switch 426 since switch 409 associated with the timing mechanism has opened. After a predetermined period of time, switch 409 is closed and relay 408 energizes. The closure of switch 412 reenergizes relay 415 and switch 418 once more closes, thus applying ACH potential to buss 421. Thus, those push buttons that are depressed in the group 18j through 18t complete circuits to their related relays and the switches associated with said energized relays control circuits that outline on indicator 225, the numerical representations corresponding to the new set-up amount.

The predetermined time period that switch 409 is held open by cam 152 provides a black-out period whereby all incandescent bulbs are deenergized. This black-out period improves the readability of the subsequently outlined numbers by preventing rapidly repeated amount set-ups that would otherwise confuse and interfere with the visual reading thereof.

Relay 275, controlled by push button 18k, when energized, effectively deenergizes certain of the incandescent bulbs in the units column and energizes other incandescent bulbs. Thus, the units column will indicate either a zero, if relay 275 is deenergized or the digit five if said relay is energized. Switch 373 associated with relay 275 provides a holding circuit for said relay after the initial circuit controlled by push button 18k has been completed. Said holding circuit operates in an analogous manner to the holding circuit heretofore described for push button 18j. Switch 374 when actuated, interrupts the circuit that supplies potential to incandescent bulbs 260, 271, 270. The uppermost contact of switch 374 is engaged by the swinging contact of said switch and a second circuit is completed to incandescent bulbs 257, 263, 266 and 272. This circuit may be traced as follows: from ACH buss 421, over conductor 458, through the closed contacts of switch 374, over conductor 470 to one terminal of incandescent bulb 257. A parallel circuit exists from conductor 470 over conductor 471, to one terminal of incandescent bulb 272. The other terminals of incandescent bulbs 277 and 262 are connected respectively to conductors 460 and 465 and are, in turn, connected to ACG common 463. A third parallel circuit exists from conductor 470 over conductor 471 and 474 to one terminal of each of the respective incandescent bulbs 263 and 266, the other terminals of which are respectively connected to conductors 460 and 465. Incandescent bulbs 264, 265, 258, 259, 263, 266, 269, 268, 267, 262 and 261 are energized through a common conductor 462, therefore, the additional energization of incandescent bulbs 257 and 272 effectively outlines the number five in the units column of said indicator.

Push buttons 18j and 18k may be depressed in addition to one of the group of push buttons 18l through 18t. The latter group of push buttons effectively outlines the digits 1 through 9. For example, relay 275, controlled by push button 18l moves switches 370, 371 and 372 to a closed position when energized, whereby incandescent bulbs 245, 246, 247, 248, 249, 250 are energized to outline in the tens column the number one.

Differing combination of incandescent bulbs may be energized in the tens column to outline the respective numerals one through nine. These combinations are controlled by actuation of the respective push buttons 18l through 18t.

Push button 18m when actuated, initially energizes relay 277. Switches 360 through 369 associated therewith accordingly move from an open position to a closed position. In so doing incandescent bulbs 234, 244, 245, 255, 247, 241, 237, 238, 239, 250 and 251 are energized to outline the numeral ten.

Push button 18n initially energizes relay 278. Switches 351 through 359 associated therewith are moved from a normally open position to a closed position to energize incandescent bulbs 233, 244, 245, 256, 255, 247, 253, 252, 250, 239 and 237. When so energized, said incandescent bulbs outline the numeral three.

Push button 18o initially energizes relay 279 to close switches 343 through 350 associated therewith. Said switches energize incandescent bulbs 250, 249, 248, 247, 246, 245, 243, 235, 236, 241 and 253 to outline the numeral four.

Push button 18p initially energizes relay 280 to actuate switches 337 through 342 associated therewith. Said switches energize incandescent bulbs 256, 245, 244, 233, 234, 235, 242, 247, 253, 252, 250, 239 and 237 to outline the numeral five.

Push button 18q controls relay 280 and accordingly switches 331, 332, 333, 334, 335 and 336. Said switches when actuated energize incandescent bulbs 245, 244, 234, 235, 236, 237, 239, 250, 252, 253, 247 and 242 to outline the numerical digit six.

Push button 18r controls relay 282 which when energized, actuates switches 321 through 330 associated therewith. Said switches energize incandescent bulbs 233, 244, 245, 256, 255, 247, 241, 237 and 238 to outline the number seven.

Push button 18s controls relay 283. Switches 315 through 320 associated therewith are closed with the energization of said relay. Incandescent bulbs 244, 245, 255, 247, 253, 252, 250, 239, 237, 236, 242 and 234 are energized by said switches to outline the numerical digit eight.

Push button 18t controls the energization of relay 284. Switches 302 through 312 associated therewith are adapted to close when said relay is energized. Said switches further energize incandescent bulbs 239, 250, 252, 253, 254, 255, 245, 244, 234, 235, 242 and 247 to outline the numerical digit nine.

Thus, push button 18j controls the hundreds column. Push button 18l through 18t selectively control the tens column and push button 18k controls the units column. Therefore, actuation of push buttons 18j, 18k and one of the group in 18l through 18t will indicate in overhead indicator 225 the amount of toll that has been paid by a particular vehicle utilizing the toll facilities.

Relays 276 through 284 are provided with holding circuits similar to the holding circuit hereinbefore described for relay 285. A detailed recitation of said holding circuits has been omitted to avoid undue repetition. However, reference to Figs. 13 and 14 of the drawings will clearly show these circuits.

It will thus be seen that there is provided a device in which the several objects of this invention are achieved and which is well adapted to meet the conditions of practical use.

The invention claimed is:

1. In combination, a plurality of amount push buttons, each being representative of a fixed amount, each amount differing one from the other, common amount indicating means, comprising means to indicate plural columns of variable and differing amounts, means operative upon pressing one of said buttons to preset a plurality of said plural column indicating means, a plurality of classification buttons, a classification indicating means associated with each classification button, and means operative upon pressing a classification button after pressing a selected amount push button for energizing the plural preset amount indicating means to indicate an amount having a plurality of digits in aligned columnar relation corresponding to the fixed amount represented by the pressed amount push button.

2. In combination, a plurality of amount push buttons, each being representative of a fixed amount, and each amount differing one from the other amount indicating means, comprising means to indicate plural columns of variable and differing amounts, means operative upon pressing one of said buttons to preset a plurality of said plural column indicating means, a plurality of classification buttons, a classification indicating means associated with each classification button, means operative upon pressing a classification button after pressing a selected amount push button for energizing the plural preset amount indicating means to indicate an amount having a plurality of digits in aligned columnar relation corresponding to the fixed amount represented by the pressed amount push button, and means to delay the energization of the preset amount indicating means for a predetermined period of time after pressing said classification button.

3. In combination, a plurality of amount push buttons, each being representative of a fixed amount, and each amount differing one from the other, common amount indicating means, comprising means to indicate plural columns of variable and differing amounts, means operative upon pressing one of said buttons to preset a plurality of said plural column indicating means, a plurality of classification buttons, a classification indicating means associated with each classification button, means operative upon pressing a classification button after pressing a selected amount push button for energizing the plural preset amount indicating means to indicate an amount having a plurality of digits in aligned columnar relation corresponding to the fixed amount represented by the pressed amount push button, means to delay the energization of the preset amount indicating means for a predetermined period of time after pressing said clasification button, and means to maintain the preset indicating means in energized conditions for a predetermined period of time after said preset indicating means is energized.

4. In combination, a plurality of amount push buttons, each being representative of a fixed amount, and each amount differing one from the other, common amount indicating means, comprising means to indicate plural columns of variable and differing amounts, means operative upon pressing one of said buttons to preset a plurality of said plural column indicating means, a plurality of classification buttons, a classification indicating means associated with each classification button, means operative upon pressing a classification button after pressing a selected amount push button for energizing the plural preset amount indicating means to indicate an amount having a plurality of digits in aligned columnar relation corresponding to the fixed amount represented by the pressed amount push button, means to delay the energization of the preset amount indicating means for a predetermined period of time after pressing said classification button, means to maintain the preset indicating means in energized conditions for a predetermined period of time after said preset indicating means is energized, and means to prevent de-energization of said preset indicating means during the predetermined period of time that the indicating means is energized.

5. In combination, a plurality of amount push buttons, each being representative of a differing amount, amount indicating means comprising means to indicate plural columns of differing amounts, means operative upon pressing one of said buttons to preset a plurality of said plural column indicating means, a plurality of classification buttons, a classification indicating means associated with each classification button, means operative upon pressing a classification button after pressing a selected amount button for energizing the plural preset amount indicating means to indicate an amount having a plurality of digits therein corresponding to the amount represented by the pressed amount push button, means to delay the energization of the preset amount indicating means for a predetermined period of time after pressing said classification button, means to maintain the energized amount indicating means in energized condition for at least a predetermined period of time, means to maintain the energized amount indicating means in energized condition after the pressed buttons have returned to their initial positions, and means to de-energize said energized amount indicating means after said predetermined period of energization and upon actuation of a second amount button and a classification button.

6. In combination, a plurality of amount push buttons, each being representative of a differing amount, amount indicating means comprising means to indicate plural columns of differing amounts, means operative upon pressing one of said buttons to preset a plurality of said plural column indicating means, a plurality of classification buttons, a classification indicating means associated with each classification button, means operative upon pressing a classification button after pressing a selected amount button for energizing the plural preset amount indicating means to indicate an amount having a plurality on digits therein corresponding to the amount represented by the pressed amount push button, means to delay the energization of the preset amount indicating means for a predetermined period of time after pressing said classification button, means to maintain the energized amount indicating means in energized condition for at least a predetermined period of time, means to maintain the energized amount indicating means in energized condition after the pressed buttons have returned to their initial position, means to de-energize said energized amount indicating means after said predetermined period of energization and upon actuation of a second amount button and a classification button, and means to prevent de-energization of said energized amount indicating means upon the actuation of a second amount push button until at least one of said plurality of classification buttons has been pressed.

7. In combination, a plurality of amount push buttons, an amount indicating means associated with each button having portions thereof in common with other amount indicating means, means normally energizing some portions of said amount indicating means, means operative upon pressing one of said buttons to preset its indicating means, a plurality of classification buttons, a classification indicating means associated with each classification button, and means operative upon pressing a classification button after pressing an amount button for deenergizing said normally energized portions of the said amount indicating means and energizing the preset amount indicating means associated with the pressed amount button.

8. In combination, plural groups of amount push buttons, a common indicating device comprising a plurality of energizable indicators, each of said pluralities of indicators comprising means to indicate a column of numerical data, a plurality of classification buttons, a classification indicating means associated with each classification button, means to prevent concurrent pressing of two or more buttons in each of said groups of amount and classification buttons, means operative upon pressing a classification button to energize the plurality of indicating means associated with pressed amount push buttons for energizing the preset amount indicating means associated with the pressed amount buttons to indicate plural columns of numerical data.

9. In combination, a hundreds amount push button, a plurality of tens amount push buttons, a unit amount push button, an indicating device comprising a plurality of energizable indicators disposed in units, tens and hundreds columnar relation, each of said columns of indicators associated with the respective units, tens and hundreds amount push buttons, means normally energizing pluralities of said energizable indicators to indicate zero in the units and tens columns, a plurality of classification buttons, a classification indicating means associated with each classification button, means operative upon pressing a respective unit, tens and hundreds amount push button to preset the associated indicator, and means operative upon pressing a classification button after pressing at least one of said amount buttons, for de-energizing the normally energized indicators and energizing the related preset amount indicators.

10. In combination, an amount push button, an amount indicating means associated with said button for indicating the numerical value of the amount designated to said button, means operative upon pressing said button to preset said indicating means, means normally energizing said indicating means to indicate a zero value, a plurality of classification push buttons, means operative upon pressing one of said classification push buttons after pressing said amount push button for de-energizing the zero value indicated by said indicating means, and energizing said indicating means to indicate the related value of said amount push button.

11. In combination, a plurality of amount push buttons, relay means associated with each push button, auxiliary relay means associated with some of said push buttons, an indicating device comprising pluralities of energizable indicators disposed in columnar relation, means operative by said auxiliary relay means to normally energize some of said energizable indicators, means operative upon the pressing of one of said amount push buttons to preset the relay means associated therewith, a plurality of classification push buttons, and means operative upon actuation of one of said classification push buttons to energize said preset relay means, and means controlled by said energized preset relay means for controlling the auxiliary relay means to de-energize the normally energized indicators and energize other indicators to indicate the numerical value of the pressed amount push button.

12. In combination, a first series of push buttons, a second series of push buttons, an indicating means associated with each of said first series of push buttons, means to preset said indicating means upon the pressing of one of said first series of push buttons, indicating means associated with each of said second series of push buttons, means operative upon pressing one of said second series of push buttons after pressing one of said first series of push buttons to energize their related indicating means, means to delay energization of the indicating means associated with the pressed push button in said first series of push buttons for a predetermined period of time after the pressing of the selected button in said second series of push buttons, timing means, means controlled by said timing means to actuate said relay means, means to latch the pressed push buttons in pressed condition, and means operable by said timing means to release said last means to release the pressed push buttons a predetermined time after the delay-energized indicating means have energized.

13. In combination, a first series of push buttons, a second series of push buttons, an indicating means associated with each of said first series of push buttons, means to preset said indicating means upon the pressing of one of said first series of push buttons, indicating means associated with each of said second series of push buttons, means operative upon pressing one of said second series of push buttons after pressing one of said first series of push buttons to energize their related indicating means, means to delay energization of the indicating means associated with the pressed push button in said first series of push buttons for a predetermined period of time after the pressing of the selected button in said second series of push buttons, timing means, means controlled by said timing means to actuate said delay means, means to latch the pressed push buttons in pressed condition, means operable by said timing means to release said last means to release the pressed push buttons a predetermined time after the delay-energized indicating means have energized, and means to maintain all of said indicating means in energized condition after said push buttons have been released and have returned to their initial positions.

14. In combination, a push button, a relay associated therewith energizable upon the pressing of said push button, circuit means preset by the energization of said relay, indicating means associated with said circuit means, comprising means to indicate plural columns of numerical data a second push button, circuit means associated with said second push button, and means controlled by said second circuit means operable to energize the first circuit means whereby said indicating means is energized to indicate the plural columns of numerical data represented by the first push button.

References Cited in the file of this patent

UNITED STATES PATENTS

| Number | Name | Date |
|---|---|---|
| 2,043,707 | Nelson | June 9, 1936 |
| 2,081,822 | Kimball | May 25, 1937 |
| 2,142,106 | Boswau | Jan. 3, 1939 |
| 2,146,576 | Haselton et al. | Feb. 7, 1939 |
| 2,364,937 | Baur et al. | Dec. 12, 1944 |
| 2,568,378 | Zemel | Sept. 18, 1951 |